No. 744,609. Patented November 17, 1903.

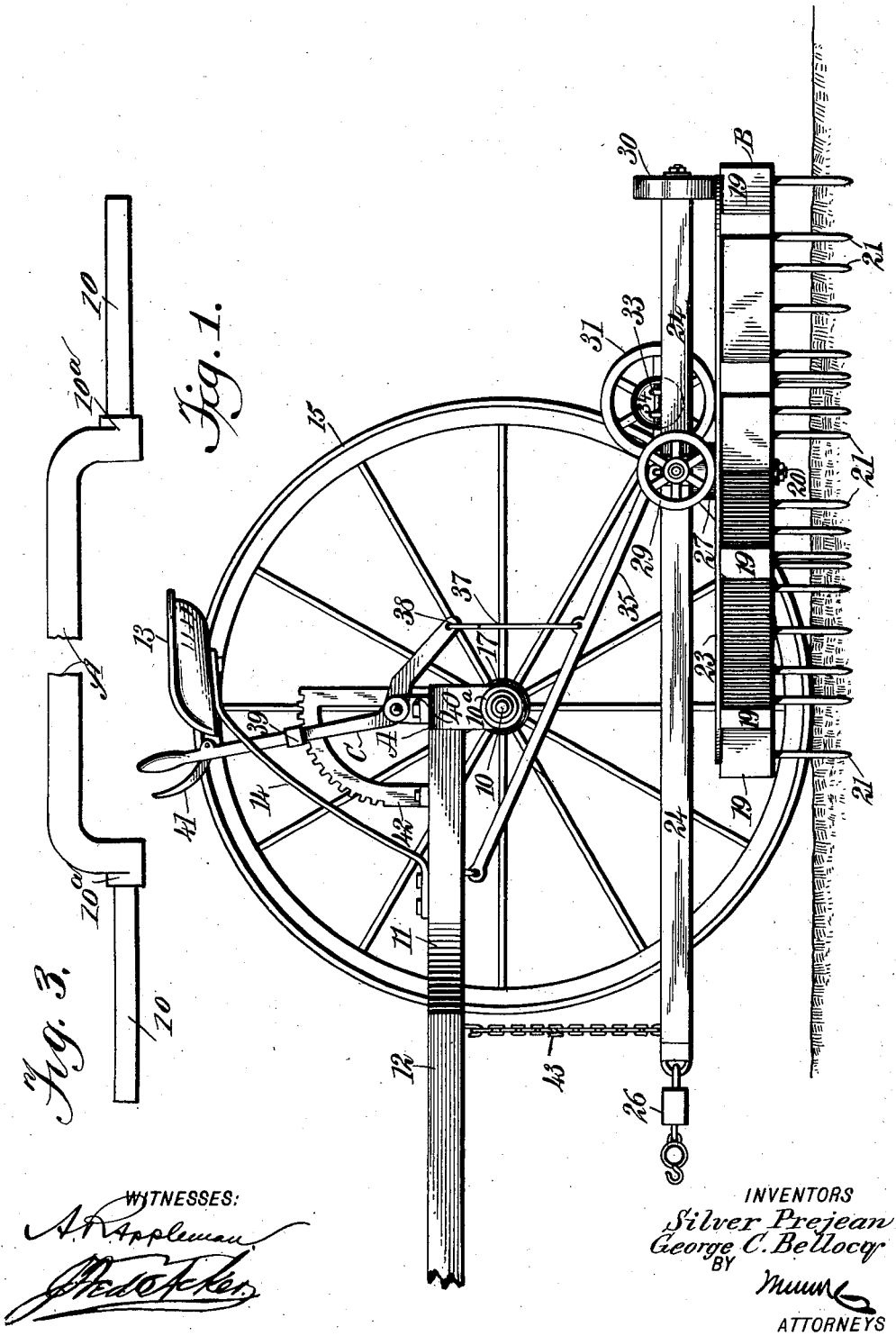

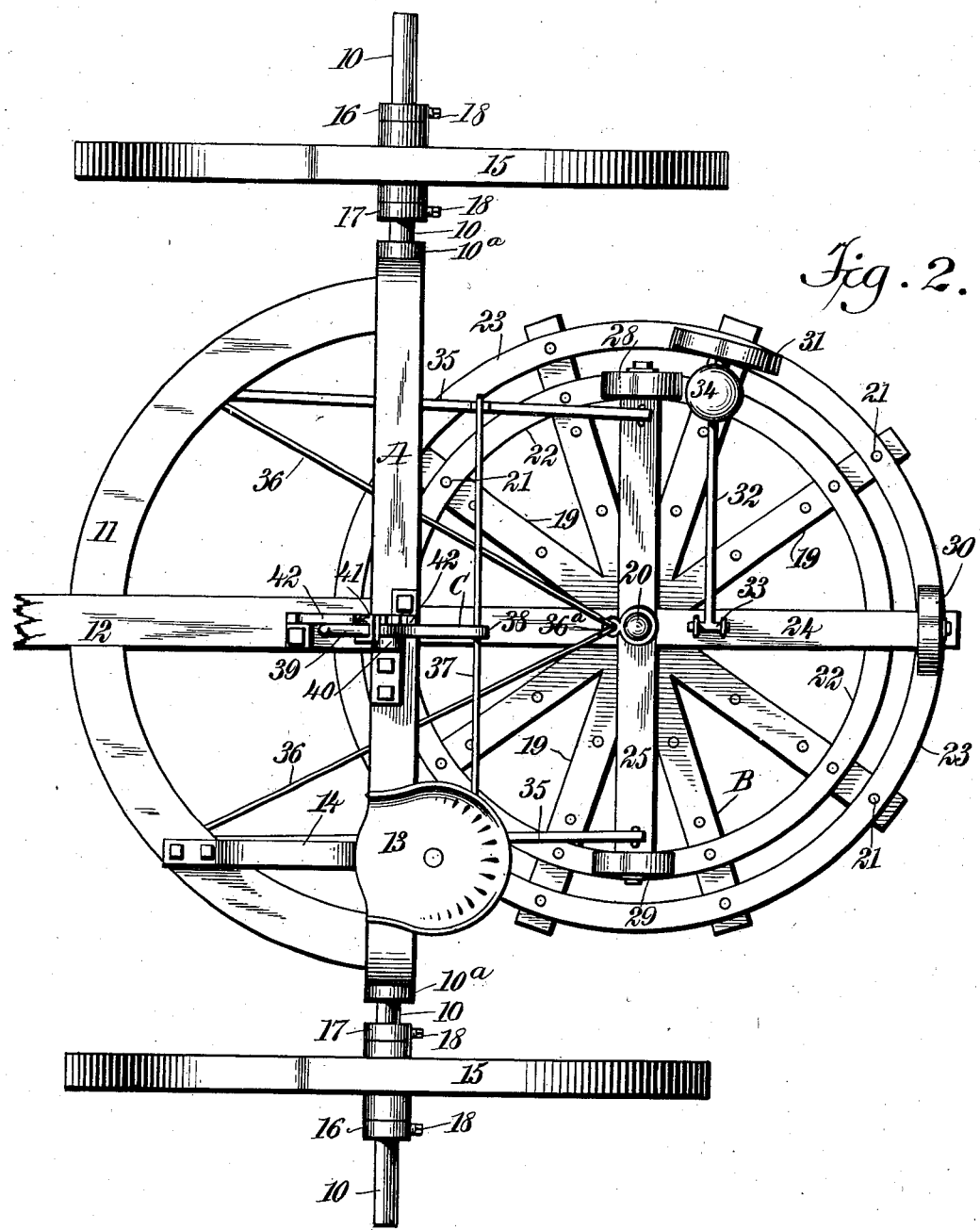

UNITED STATES PATENT OFFICE.

SILVER PREJEAN AND GEORGE CHARLES BELLOCQ, OF BELLE ALLIANCE, LOUISIANA.

HARROW.

SPECIFICATION forming part of Letters Patent No. 744,609, dated November 17, 1903.

Application filed June 23, 1903. Serial No. 162,766. (No model.)

*To all whom it may concern:*

Be it known that we, SILVER PREJEAN and GEORGE CHARLES BELLOCQ, citizens of the United States, and residents of Belle Alliance, in the parish of Assumption and State of Louisiana, have invented a new and Improved Harrow, of which the following is a full, clear, and exact description.

Our invention relates to an improvement in revolving harrows; and the purpose of the invention is to provide a harrow which will have a wheeled support to and from the field and during operation and means whereby the harrow can be kept in one position while rotating relative to the rows between which cultivation is to be effected, the construction being, furthermore, such that in operation the harrow will not jump from side to side, as is customary in ordinary harrows, thereby relieving the team from unnecessary incumbrance and enabling the team to direct all its energy to the draft of the machine.

Another purpose of the invention is to provide means for raising and lowering the cultivating medium, so that it may be set to work shallow or deep and can be elevated at any time to pass over any row of plants without injury to them.

Another purpose of the invention is to provide an arched axle having long or extended spindles and wheels adjustably mounted upon the spindles, whereby the machine may be adapted to narrow or wide spaces between rows and the wheels adjusted to straddle the rows, thus enabling the machine to be successfully operated in cultivating crops when grown to some height above the surface of the ground without injury to the plants.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine, one of the supporting-wheels being removed. Fig. 2 is a plan view of the machine, and Fig. 3 is a detail view of the arched axle.

A represents an arched axle, and at the lower portions of the downwardly-extending arms of the arched axle bosses 10$^a$ are illustrated as being produced, and from these bosses long spindles 10 are carried horizontally outward. A segmental bar 11 extends forwardly from the upper part of the arched axle A, as is best shown in Fig. 2, and the guide-pole of the machine is attached at its rear end to the central portion of the upper part of the arched axle A and to the segmental forwardly-extending bar 11. The said pole 12 may be of any desired length.

The driver's seat 13 is located at the left-hand side of the frame just described, the standard 14 of the driver's seat being preferably secured to the forwardly-extending segmental brace-bar 11, as is shown particularly in Fig. 2. The supporting-wheels 15 are loosely mounted on the spindles 10 and are adjustable on the said spindles, said adjustment being accomplished by locating loose collars 16 and 17 on the spindles, one in engagement with the outside face of the hub of a supporting-wheel and the other in engagement with the inside face of the hub, the said loose collars 16 and 17 being held fixedly to the spindles 10 when the wheels have been adjusted by means of suitable set-screws 18, as is also shown in Fig. 2.

The harrow B is of circular form in plan view and is adapted to rotate as the machine is advanced. The frame of the said harrow B consists of a series of radial spokes or bars 19, suitably connected where they meet at the central portion of the harrow, and where the said spokes or bars 19 meet an opening is made through which the pivot-pin 20 of the harrow is passed. The said pivot-pin is provided at its lower end with a suitable washer and nut, as is indicated in Fig. 1.

Teeth 21 of any desired type are secured in longitudinal order to the radial spokes, bars, or arms 19 of the frame of the harrow B, and an inner circular track 22 is attached to the upper faces of the said arms, bars, or spokes 19, while an outer concentric track 23 is also attached to the upper faces of the said arms or spokes, as is best shown in Fig. 2.

A draft-tongue 24 extends over the central portion of the harrow B from its rear beyond its front portion a suitable distance, and the said pivot-pin 20 of the harrow B is passed through this draft-tongue 24. Where the pivot-pin 20 passes through said draft-tongue 24, a transverse member 25 is formed, and at the forward end of the said draft-tongue a doubletree 26 or a draft-tree of any suitable description is attached, as is shown in Fig. 1. Between the said tongue 24 and the upper face of the harrow B a washer 27 of suitable size is located, through which washer the pivot-pin 20 is made to loosely pass, as is shown in Fig. 1.

At one end of the transverse member 25 of the draft-tongue 24 a friction-wheel 28 is mounted to freely turn, engaging with the upper face of the inner track 22 at the top of the harrow-frame, and at the opposite end of the said transverse member 25 of the draft-tongue a second friction-roller 29 is mounted to turn, being likewise in engagement with the upper face of the inner track 22, while at the rear end of the draft-tongue 24 a friction-roller 30 is mounted to freely turn. This latter friction-roller is in engagement with the upper face of the outer circular track 23. These friction-rollers 28, 29, and 30 serve to hold the rotary harrow B in proper position for effective service in the ground.

Sometimes it is desirable to have the harrow B rotate in one direction, and at other times it may be advisable to have it rotate in an opposite direction. This guidance in the matter of the rotation of the horrow is brought about by pivoting an arm 32 at its inner end 33 on the draft-tongue 24 at the rear of the transverse member 25, as is shown in Fig. 2, and at the outer end of this arm 32 a friction-roller 31 is mounted to turn, adapted to engage with the upper face of the outer circular track 23, and on the arm 32 adjacent to the friction-roller 31 a weight 34 is secured. When the weighted arm 32 is carried, for example, to the right, bearing upon the harrow, the direction of rotation will be forwardly from the rear, and when the said weighted arm is drawn over so that the friction-roller 31 engages with the opposite side of the harrow the direction of rotation will be rearward from the front.

The harrow B and the connected draft-tongue 24 are attached to the main or wheel-supported frame of the machine by means of side bars 35, which have a pivotal or hinged attachment to the ends of the transverse member 25 of the draft-tongue, and likewise a pivotal or hinged connection with the under side portions of the segmental brace-bar 11. In order that the harrow B shall not have lateral movement in operation, intermediate connecting-bars 36 are employed, and these intermediate connecting-bars 36 have a link connection 36ª at their rear ends with the pivot-pin 20, as is shown in Fig. 2, while the upper forward ends of the intermediate bars 36 are pivotally attached to the segmental brace-bar 11, preferably at those points where the side bars 35 are likewise attached at their upper forward ends.

The harrow and connected draft-tongue are raised and lowered, so that the harrow-teeth will enter the ground to a greater or less extent and so that the harrow-teeth may entirely clear the ground or be lifted out of engagement with comparatively high growing plants. This vertical adjustment of the harrow is accomplished by pivotally attaching the ends of a bail 37 to the side bars 35 at a point to the rear of the axle A, and the lower member 38 of an angled hand-lever C is connected with the central portion of the bail 37, the said hand-lever C at the junction of its members being fulcrumed in a suitable bracket 40, supported on the upper portion of the arched axle A. The vertical or upwardly-extending member 39 of the hand-lever C is provided with any approved type of thumb-latch 41, which thumb-latch is adapted to engage with a rack 42, supported partially on the axle A and on the pole 12, whereby the harrow may be raised and lowered as desired and held in its adjusted position.

The extension-spindles 10 of the axle on which the wheels 15 are adjustably held permit the operator to place the wheels at any distance required, in or out, to cause the harrow to work in the middle of the row, no matter how wide or how narrow, while the wheels straddle two rows. By means of the pivoted arms 36 connecting the draft-tongue and harrow with the wheel-support and by reason of the draft being directed from the center of the harrow the pivotal and draft connections described have a tendency to hold the harrow down to the ground in action, thereby effecting a perfect pulverization of the soil, and at the same time the harrow is prevented from having lateral movement. Consequently the shoulders of the draft-animals are not liable to be chafed, and such animals may exert all their power to draw the machine without inconvenience. The forward end of the draft-tongue 24 is preferably supported by a chain 43, carried up to an attachment with the pole 12.

Having thus described our invention, we claim as new and desire to secure by Letters Patent—

1. The combination with a circular harrow, of a draft-tongue pivotally connected to the harrow at the center thereof, friction-rollers carried by the draft-tongue for engagement with the upper face of the harrow, and a weighted arm provided with a friction-roller, pivoted to the draft-tongue and adapted for engagement with the upper face of either one side or the other of said harrow for the purpose specified.

2. A wheel-supported frame, a guide-pole for said frame, a draft-tongue below the frame, a transverse member attached to the draft-tongue, longitudinally-extending side bars pivotally attached at their forward ends to the wheel-supported frame on opposite sides of the guide-pole and at their rear ends to the transverse member of the draft-tongue, the point of connection of said bars with said transverse member being at each side of the center of said member, intermediate bars connected at their forward ends to said wheel-supported frame at points spaced apart from each other, and extending rearwardly and diverging toward each other and connected at their rear ends with the transverse member of the draft-tongue, between the points at which the rear ends of the side bars are connected therewith, a harrow pivotally connected to the draft-tongue at the junction of said tongue with said transverse member, and means for causing the harrows to revolve in either direction.

3. A wheel-supported frame, a draft-tongue below the frame, a transverse member attached to the draft-tongue, side bars pivotally attached to the transverse member of the said wheel-supported frame, the attachment of the side bars being at each side of the center of the said transverse member of the draft-tongue, intermediate bars connected with the said wheel-supported frame at points adjacent to the connection therewith of the side bars, the said intermediate bars being made to converge at their lower ends, having pivotal connection at their lower ends with the central portion of the transverse member of the draft-bar, a harrow, a pivotal connection between the harrow and the draft-tongue where the transverse member crosses the draft-tongue, the said harrow being adapted for rotary motion, means for raising and lowering the draft-tongue and harrow, tracks located on the upper surface of the harrow, and friction-rollers carried by the rear end of the draft-tongue and the ends of the transverse member of the draft-tongue, the said friction-rollers engaging with the tracks on the harrow, as described.

4. The combination of a wheel-supported frame, a draft-tongue below the said frame, pivotal connections between the draft-tongue and the said frame, a harrow pivotally connected with the draft-tongue, being adapted for rotary motion, friction-rollers carried by the draft-tongue, for engagement with the upper face of the harrow, and a weighted arm provided with a friction-roller, pivoted to the draft-tongue and adapted for engagement with either one or the other side of the said harrow at its upper surface, for the purpose described.

SILVER PREJEAN.
GEORGE CHARLES BELLOCQ.

Witnesses:
L. A. TRUXILLO,
ERIC TRUXILLO.